United States Patent

DeSimone et al.

[11] Patent Number: 5,905,872
[45] Date of Patent: May 18, 1999

[54] METHOD OF TRANSFERRING CONNECTION MANAGEMENT INFORMATION IN WORLD WIDEWEB REQUESTS AND RESPONSES

[75] Inventors: Antonio DeSimone, Ocean; David Hilton Shur, Middletown; Sandeep Sibal, Matawan, all of N.J.

[73] Assignee: AT&T Corp., Middletown, N.J.

[21] Appl. No.: 08/744,232

[22] Filed: Nov. 5, 1996

[51] Int. Cl.[6] .................................................. G06F 13/00
[52] U.S. Cl. .............................. 395/200.75; 395/200.59
[58] Field of Search ................................... 370/400, 401; 707/10; 395/200.48, 200.59, 200.75

[56] References Cited

U.S. PATENT DOCUMENTS 5,687,320  11/1997  Wiley et al. .................... 395/200.16
5,768,515   6/1998  Choquier et al. ................ 395/200.36
5,768,527   6/1998  Zhu et al. ....................... 395/200.61

Primary Examiner—Ellis B. Ramirez
Assistant Examiner—William Titcomb

[57] ABSTRACT

In order to reduce the delay and/or loss of packets caused by the transmission through a large number of routers on the Internet, a direct connection is established between a client (or its proxy) and a server if the client (or its proxy) and the server are connected to the same alternative subnetwork. Control management information, including the type of subnetwork to which each is connected, as well as the address of the client (or its proxy) and the server are transmitted to the other on the Internet in an optional HTTP header field. After receipt of the addressing information, a direct connection is established on the alternative subnetwork between the client (or its proxy) and the server for purposes of streaming information from the server to the client.

19 Claims, 5 Drawing Sheets

FIG. 2

REQUEST:
GET video.mpeg hhttp/1.0
FROM: client1@xyz.com
SUBNETWORK-TYPE:ISDN
SUBNETWORK-ADDRESS: 9089491234
— 205

REQUEST:
GET VIDEO.MPEG HTTP/1.0
FROM:client1@xyz.com
— 202

RESPONSE:
Date:Saturday 19-Sept-96 6:07:45 GMT
Server:NCSA/1.4
Content-type: video/mpeg
Content-length: 876999
— 212

METHOD OF TRANSFERRING CONNECTION MANAGEMENT INFORMATION IN WORLD WIDEWEB REQUESTS AND RESPONSES

TECHNICAL FIELD

This invention relates to data communications and computer networking.

BACKGROUND OF THE INVENTION

As the Internet becomes more complex, comprising a continuously increasing number of interconnected networks, the packetized requests from client terminals and packetized server responses pass through an ever increasing number of routers between the two endpoints. It is not uncommon, for example, that these packets traverse eighteen or more routers along their route. Since the Internet does not provide any guaranteed Quality of Service (QoS), certain packets may be delayed or lost as they pass through these routers, which likelihood increases with the number of routers through which the packets traverse. If a stream of packets transmitted from a server to a client contains real-time multimedia content (audio, video, and data), the received stream may contain missing or delayed packets. In many cases, such missing packets may necessitate that the client re-request the content of the previously requested URL, thereby requiring the server to resend the entire content. For a transmitted video clip, for example, this is analogous to rewinding a video tape to its beginning and re-watching the entire tape to view the missing portion. This is a waste of resources of the server, the network, and the time of the user at the client.

In some environments where the clients and the servers are on the same subnetwork, such as the same ATM network or ISDN network (a public switched or private ISDN network, for example), the downstreaming of information from the server to the client can bypass the routers, and thus the delay and loss-imparting network elements, if the stations at both endpoints are provided with each other's address on their common subnetwork. For example, if the client and server know of each other's address in the ISDN domain, a direct connection can be established on the ISDN network, as opposed to the Internet, for at least the streaming of information from the server to the client. The key element in being able to use subnetwork interconnectivity is thus providing one endpoint with the subnetwork address of the other from which a direct connection between the endpoints can be established on the subnetwork.

A fairly general way to discover such subnetwork addresses is to place special address translating servers in the Internet network. Clients and servers can then query these address translators to obtain the subnetwork addresses. In order to provide wide area interconnectivity between clients and servers, a significant infrastructure is necessary to put such a network of translators in place. Furthermore, in order to enable clients and servers to take advantage of these translator servers within the Internet, the software on both the clients and host servers end devices must be modified to access the translator servers to obtain the alternate address information.

SUMMARY OF THE INVENTION

In accordance with the present invention, connection management information is transferred between Web clients and servers by means of messages incorporated in optional header fields of the HTTP protocol header; the HTTP protocol being the protocol through which web clients and servers communicate with each other. These fields in an HTTP message carry information related to connection management that is used for direct communication of the client and server along alternative paths that provide a QoS greater than what can be achieved over the Internet.

The connection management information, incorporated within optional header fields of the HTTP protocol header, includes addressing information which specifies addresses on a subnetwork, such as ATM addresses, ISDN or POTS E.164 numbers, as well as an alternate Internet Protocol (IP) address that may be used to communicate over non-persistent or switched paths. In addition, the addressing information includes the subnetwork type on which the addresses are applicable. Examples of the latter may include the IEEE 802 family of networks (e.g., Ethernet or token-ring), Emulated LAN (ELAN), ATM, ISDN, FR (Frame Relay), and X.25 virtual circuit networks. Further, for those subnetworks for which QoS can be controlled, such as ATM or FR networks, the connection management information transmitted in the header fields can also include QoS information such as a required bandwidth, maximum packet delay, maximum variance of packet delay, maximum packet loss, and preferred Socket type (e.g., datagram (UDP), or stream (TCP)).

The optional headers in the HTTP message containing the connection management information may be inserted by a server, a client, or an intermediate system on behalf of the client, the latter referred to as a proxy on the World Wide Web (WWW). The HTTP messages are initially delivered over a router network (e.g., the Internet), using multiple router hops rather than a direct connection between the communication endpoints. The Web client or server endpoint then uses the additional addressing information contained in the header to establish a direct connection to the other endpoint to provide services (e.g., the delivery of information) on the direct network connection. As an alternative, the address information provided to the other end can be of an intermediate system (IS), such as the proxy or a specialized router node, and rather than a direct connection between the two endpoints, one of the original endpoints may establish a direct connection on the subnetwork with the intermediate system. When the underlying subnetwork is capable of acting upon QoS information, QoS information included in the header may be used by either a client, or a proxy acting on behalf of the client. A program running on the client or proxy interprets the QoS response information, and indicates with what QoS a direct connection (known as a cut-through) between client and server is to be undertaken.

BRIEF DESCRIPTION OF THE DRAWINGS

FIG. 2 shows the flow of information between a client, a proxy and a server, wherein the server sets up a direct connection to the proxy;

DETAILED DESCRIPTION

Figure 1:
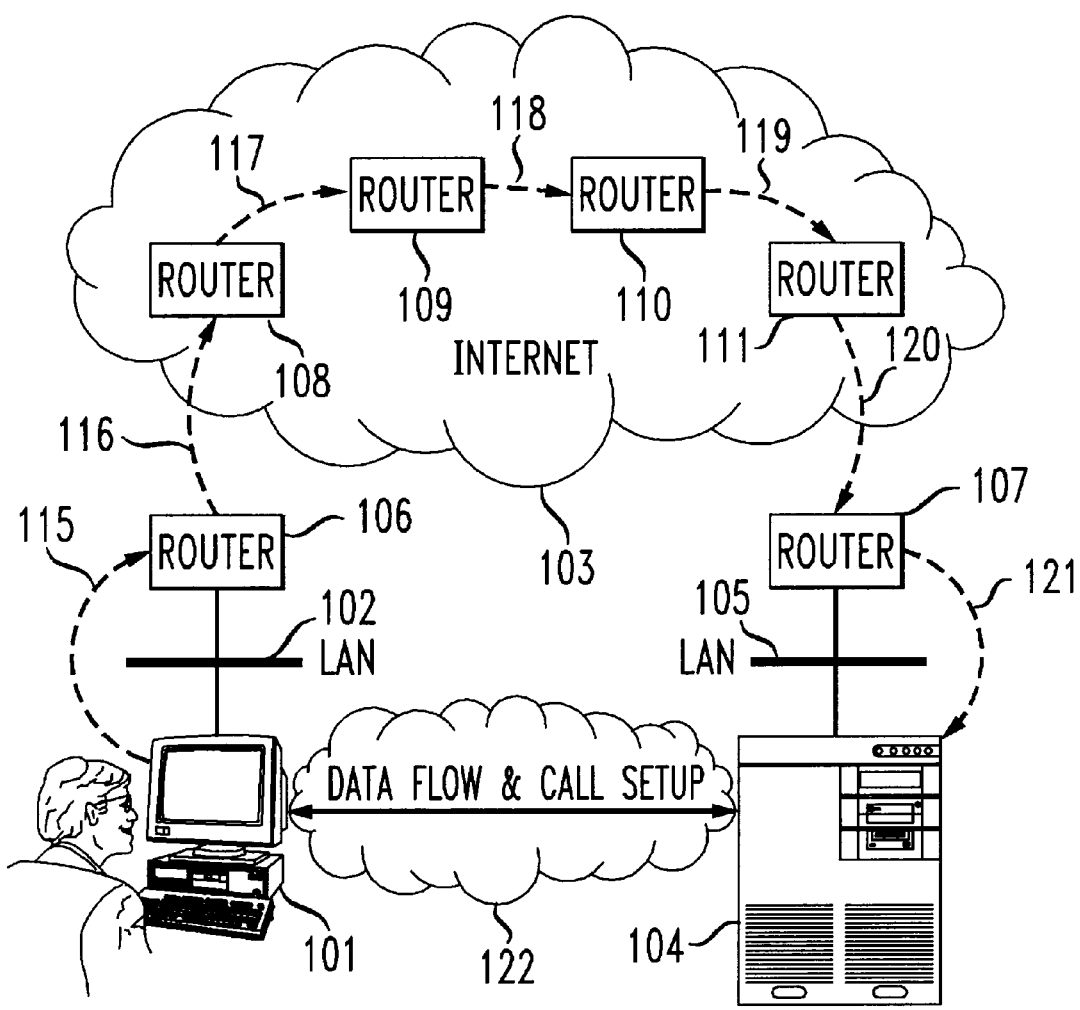
FIG. 1 shows the flow of information between a client and a server in establishing an initial connection over the Internet between the endpoints and a subsequent direct connection there between in response to the receipt in an HTTP request of a subnetwork type and an address.

With reference to FIG. 1, a first host, client terminal 101, connected to a LAN 102, initiates an HTTP request through the Internet 103 to a second host, server 104, connected on LAN 105. This request is forwarded to server 104 through a series of hops 115–121 through routers (106 and 107) "off" the Internet and routers (108, 109, 110 and 111) "on" the Internet. In accordance with the present invention, the HTTP request includes fields that provide connection management information. Specifically, the HTTP header fields include the type of subnetwork to which client 101 is also connected, as well as the subnetwork address of client 101. Such subnetwork addressing information can be used to establish a direct connection between the client and server hosts, when both such hosts are attached to the same "logical" subnetwork type (e.g., both hosts have ISDN interfaces, or both are members of a common ATM inter-network).

When server 104 receives the HTTP request, it directly sets up a connection (122) on a subnetwork. Once this cut-through is established, data flow proceeds on the subnetwork directly from server 104 to client 101, without needing to rely on the forwarding of packets by the IP routers. Depending on the capabilities of the end-points, the cut-through between server 104 and client 101 may consist of an IP protocol-based communication (encapsulated within the subnetwork protocol), or a native mode communication using only the subnetwork protocol mechanism. The latter approach may be employed with emerging application interfaces such as WINSOCK II, which are capable of supporting multiple networking technologies underneath an abstract Application Programming Interface (API). The former approach is employed when only legacy APIs such as WINSOCK I are available.

As previously noted, when the underlying subnetwork is capable of acting upon QoS information, QoS information included with the HTTP header may be used by either a client, or a proxy host acting on behalf of the client. A program running on the client or proxy then interprets the QoS response information, and indicates with what QoS a cut-through between client and server should be undertaken.

The scenarios described hereinbelow illustrate how the present invention can be utilized for WWW-based multimedia-on-demand applications, where a client downloads a file containing audio and/or video information for playback from a WWW server.

It is assumed in these scenarios that the client utilizes a standard IP API. The communication path in each scenario is asymmetric. Communication from the client to the server follows the standard IP routed path. Communication from the server to the client/proxy follows the shortcut path. With the exception of the client-side proxy case below, no changes are needed on the client side.

With reference to FIG. 2, a client 201 forwards an HTTP request 202 to proxy 203 via router 204 on the Internet 220, noted as steps S1 and S2. Proxy 203 adds the subnetwork type and subnetwork address (SA) of an intermediate system (IS) as an optional header, and forwards a modified HTTP request 205 to HTTP server 206. This request passes through routers 204, 207 and 208, in steps S3, S4 and S5, to reach server 206. As noted in request 205, the subnetwork type indicated is ISDN, with an illustrative SA of 9089491234. This scenario depicts the special case where the IS address is that of the proxy itself. When server 206 receives the modified proxy request 205, it sets up a direct connection to proxy 203, on the ISDN subnetwork 209, which passes through ISDN switches 210 and 211 (step S6). In step S7, server 206 responds to the proxy request 205 with response 212 containing both control information and the requested media object. This response, received by proxy 203, is forwarded to client 201 via router 204 in steps S8 and S9.

Figure 3:
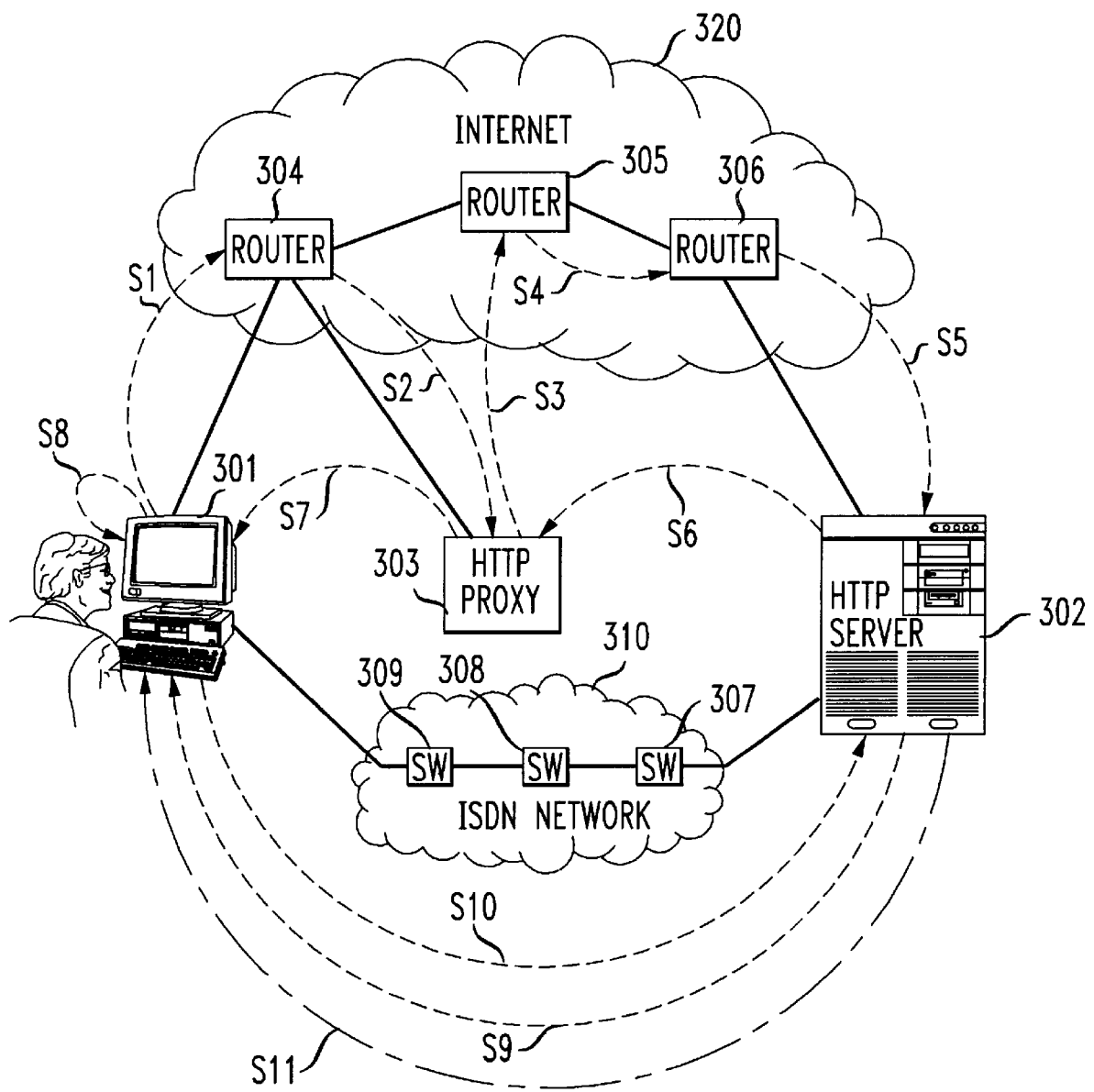
FIG. 3 shows the flow of information between a client, a proxy and a server wherein the server sets up a direct connection to the client.

In the scenario of FIG. 3, a direct connection is established between a HTTP server 302 and client 301, rather than through the proxy 303 through which the client forwards its HTTP requests and receives is usual Internet responses. In FIG. 3, the client 301 forwards the HTTP request (not shown, but the same as request 202 in FIG. 2) to proxy 303 via router 304 in Internet 320 (steps S1 and S2). Proxy 303 adds the subnetwork type to which it is connected (ISDN in this scenario) and the SA of client 301 as an optional header, and forwards the modified request to HTTP server 302 through routers 305 and 306 on the Internet (steps S3, S4, and S5). Server 302 responds to the proxy request with an acknowledgment to proxy 303, back through routers 305 and 306, that the request succeeded (or not) and information regarding the type of helper application needed by client 301 (step S6). In step S7, proxy 303 forwards that information back to client 301 through router 304. In response to that information, client 301 launches a helper application to handle the type of content that arrived from the server (step S8). In step S9, server 302 sets up a cut-through connection to client 301 on the ISDN subnetwork 310 to which client 301 and server 302 are connected, through ISDN switches 307, 308 and 309. The client 301 thereupon indicates to server 302 through the ISDN subnetwork 310, that it is ready to receive information (step S10). Information is then be streamed from server 302 to client 301 on the cut-through ISDN connection.

In the scenarios described hereinabove, the server initiates the cut-through to the client. In the scenario illustrated in FIG. 4, the client/proxy initiates the cut-through to the server. It is assumed that the client 401 and the proxy 403 are co-resident on the same machine. It is also assumed that both client 401 and server 402 utilize a WINSOCK II style API, where the API allows the selection of different networks for the transfer of data. This allows client 401 to communicate directly with server 402 using the transport protocol stack corresponding to the chosen subnetwork address (SA) using two-way communication. This scenario could also be carried out using a conventional IP API such as WINSOCK I. For this latter case, an extra step is needed, namely, client 401 needs to add a specific routing table entry, namely a route to the server over the direct connection.

Figure 4:
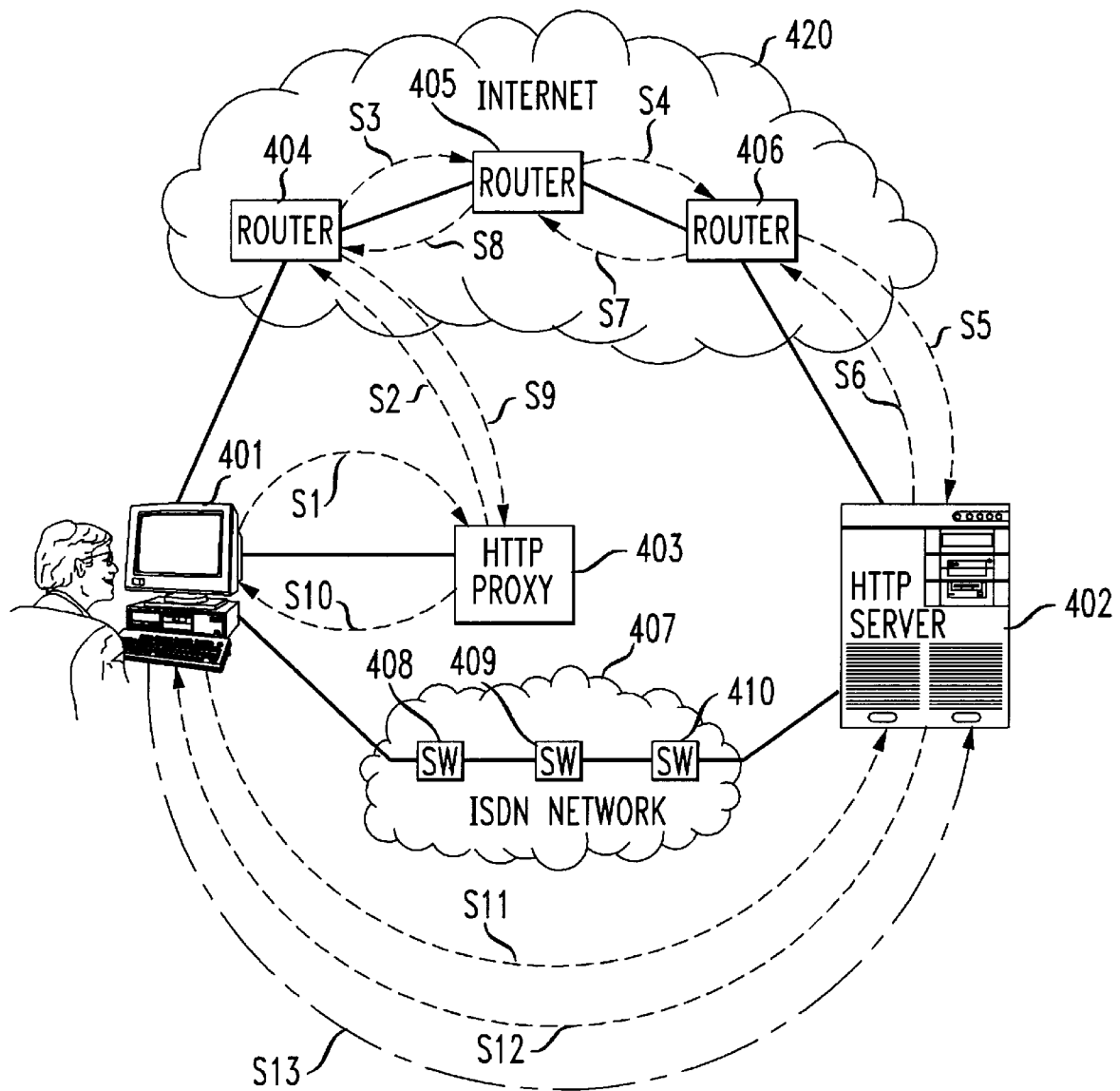
FIG. 4 shows the flow of information wherein the client initiates the cut-through to the server.

In FIG. 4, client 401 forwards an HTTP request to proxy 403 via an inter-process communication (step S1). Proxy 402 then adds the subnetwork type (ST) of client 401 (ISDN in this scenario) and forwards the modified request to HTTP server 402 on the Internet 420 via routers 404, 405 and 406 (steps S2, S3, S4 and S5). Server 402 thereupon returns its own subnetwork address (SN) on the subnetwork corresponding to the ST optional header field received in the request (ISDN in this example). This SN is returned to client 401 on the Internet through routers 406, 405, 404 and proxy 403 in steps S6, S7, S8, S9 and S10. The client-side proxy 403 then sets up a two-way cut-through connection to server 402 over the ISDN subnetwork 407 through ISDN switches 408, 409 and 410, in steps S11 and S12. Client 401 then requests information from server 402 over that direct connection in step S13. Server 402 responds over that same two-way direct connection.

When the client 401 and proxy 403 are not co-resident on the same machine but communicate via router 404, the cut-through may be made between the proxy 403 and server 402. In this case, which is not separately illustrated, but for which FIG. 4 is again referred to, the Intermediate System (IS) is proxy 403. Proxy 403 receives, via router 404, the HTTP request from client 401. Proxy 403 then adds its own subnetwork type as an optional header, and forwards the modified request to HTTP server 402 via routers 405 and 406. Server 402 returns its own sub-network address (corresponding to the given ST) to proxy 403 in an optional header. Proxy 403 then sets up a two-way connection to server 403, and the proxy 403 thereafter communicates with client 401 via router 404.

Figure 5:
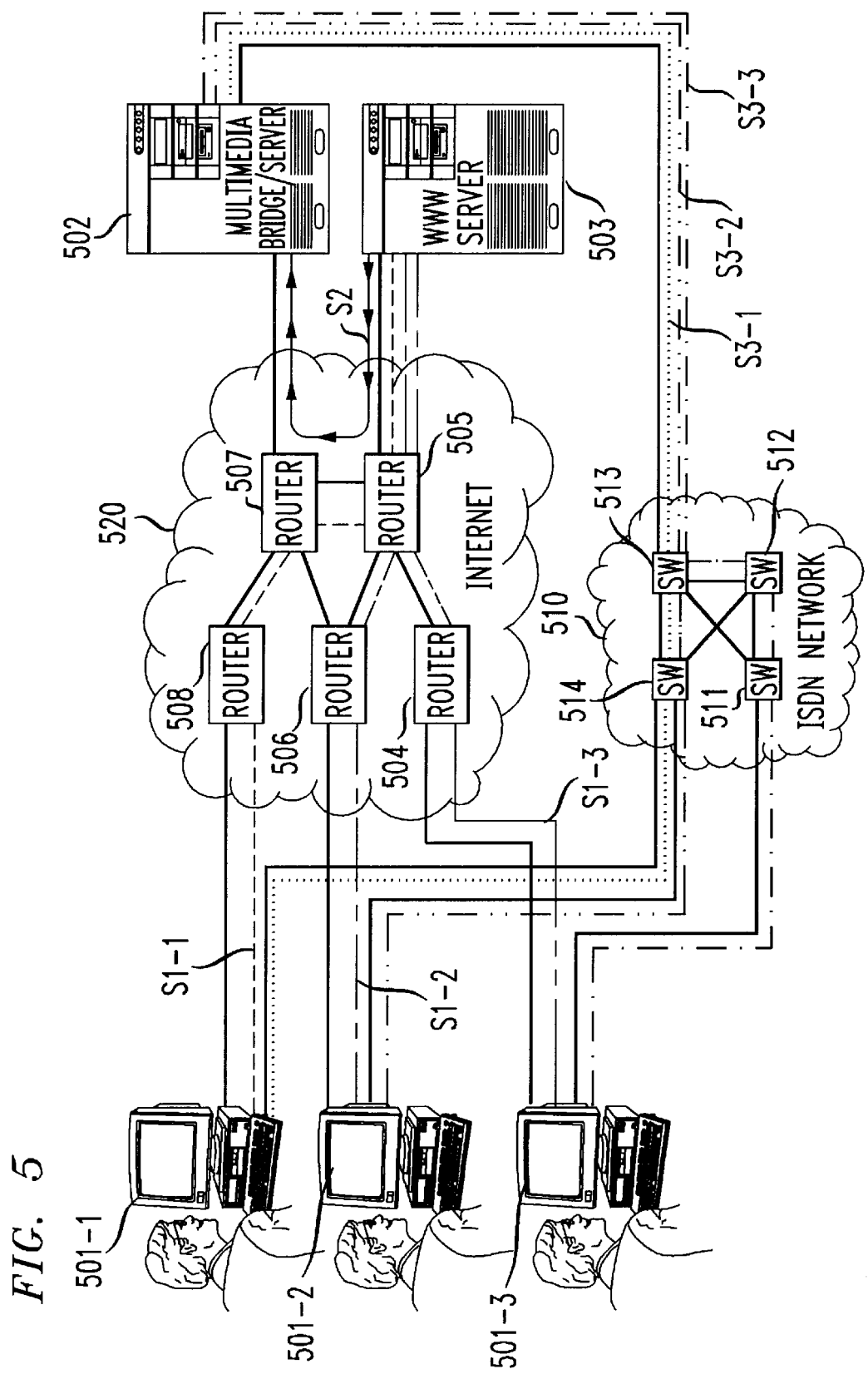
FIG. 5 shows the use of the present invention in a multimedia conferencing scenario.

The present invention can be applied to multimedia conferencing scenarios. With reference to FIG. 5, three clients, 501-1–501-3, are to be conferenced together via a multimedia bridge/server 502. For each client 501-i, (i∈1, 2, 3), client 501-i or its associated proxy (not shown) sends its subnetwork type and address on ISDN subnetwork 510 (and optionally a conference identifier) to the WWW server 503 via an optional header through the appropriate network routers on the Internet 520 (e.g., 504, 505, 506, 507 and 508) in step S1-i. Server 503 then sends, via the Internet, the subnetwork address on ISDN subnetwork 510 of each client 501-i to bridge/server 502 in step S2. Bridge 502 then establishes a direct two-way connection on ISDN subnetwork 510 to each client 501-i in step S3-i. Communication then proceeds between the clients 501-1–501-3, through bridge 502, on the ISDN subnetwork 510, through the ISDN switches 511, 512, 513 and 514. Although illustrated in FIG. 5 with three clients communicating with each other, it should be recognized that this could be readily expanded to any number of clients, N.

Alternatively, but not separately illustrated, but for which FIG. 5 can also be referred to, each client 501-i (i∈1, 2, 3) (or its proxy) can send its subnetwork address to server 503 via an optional header. Server 503 then sends the subnetwork address of bridge 502 (and optionally a conference identifier) to client 501-i (or its proxy) via a optional header. Each client 501-i (or its proxy) then establishes a two-way connection to bridge 502.

The three (or N, more generally) clients may wish to conference together without using a multimedia bridge, but rather through a subnetwork which can provide one-way point-to-multipoint capability, such as an ATM subnetwork. For this scenario each client i (i∈1, 2, 3) (or its proxy) sends its subnetwork address to a server via an optional header. The server then sends a list of the subnetwork addresses of each client i to all sending clients j(j≠i) via optional headers. For each client j(j≠i), client j(or its proxy) establishes a 1-to-3 multipoint connection to each client i.

The above-described embodiments are illustrative of the principles of the present invention. Other embodiments may be devised by those skilled in the art without departing from the spirit and. scope of the present invention.

The invention claimed is:

1. In a data network interconnecting a plurality of hosts, the network comprising a plurality of subnetworks, a method of transferring connection management information comprising:
    transmitting on a first of the subnetworks between a first endpoint host and a second endpoint host at least one optional header field containing information for enabling the direct connection on a second of the subnetworks of the second endpoint host and a predetermined host.

2. The method of claim 1 wherein the information for enabling the direct connection on the second subnetwork of the second endpoint host and a predetermined host comprises the address on the second subnetwork of the predetermined host.

3. The method of claim 2 wherein the predetermined host is the first host.

4. The method of claim 2 wherein the predetermined host is a proxy for the first host.

5. The method of claim 2 wherein the information for enabling the direct connection on the second subnetwork of the first and second hosts further comprises information for specifying a Quality of Service (QoS) on the direct connection.

6. The method of claim 1 wherein the information for enabling the direct connection on the second subnetwork of the first and second hosts comprises information identifying the type of subnetwork.

7. The method of claim 1 wherein the optional header field is an HTTP header.

8. In a data network interconnecting a plurality of hosts, the network comprising a plurality of subnetworks, a method of transferring information from a server connected on a first subnetwork and a second subnetwork comprising:
    receiving at the server on the first subnetwork at least one optional header field containing control management information, the control management information comprising an address on the second subnetwork of a predetermined host; and
    using the address on the second subnetwork received in the at least one optional header field, establishing a direct connection on the second subnetwork between the server and the predetermined host.

9. The method of claim 8 wherein the predetermined host is a client.

10. The method of claim 8 wherein the predetermined host is a proxy for a client.

11. The method of claim 8 wherein the control management information further comprises information identifying the network type of the second subnetwork.

12. The method of claim 8 wherein the control management information further comprises information for specifying a Quality of Service on the direct connection on the second subnetwork.

13. The method of claim 8 wherein the at least one optional header field is an HTTP header.

14. In a data network interconnecting a plurality of hosts, the network comprising at least first and second subnetworks, a method of transferring information from a server connected on the first and second subnetworks comprising:
    receiving on the first subnetwork from the server at a predetermined host at least one optional header field containing control management information, the control management information comprising an address of the server on the second subnetwork; and
    using the address of the server on the second subnetwork received in the at least one optional header field, establishing a direct connection on the second subnetwork from the predetermined host to the server.

15. The method of claim 14 further comprising the step of receiving on the first subnetwork from the predetermined host at the server at least one optional header field containing control management information indicating the type of the second subnetwork.

16. The method of claim 14 wherein the predetermined host is a client.

17. The method of claim 14 wherein the predetermined host is a proxy for a client.

18. In a data network comprising at least first and second subnetworks, a method of bridging together a plurality of hosts comprising:

receiving at a bridge on the first subnetwork from each of the plurality of hosts at least one optional header field containing control management information, the control management information from each host comprising an address on the second subnetwork of the host; and establishing a direct connection on the second subnetwork between the bridge and each of the plurality of hosts using the respective address on the subnetwork received from each of the hosts.

19. In a data network comprising at least first and second subnetworks, a method of bridging together at a bridge a plurality of hosts comprising:

sending on the first subnetwork to each of the plurality of hosts in at least one optional header field containing control management information, the control management information comprising an address of the bridge on the second subnetwork, and establishing a direct connection on the second subnetwork between each of the plurality of hosts and the bridge using the address of the bridge on the second subnetwork.

* * * * *